(12) United States Patent
Batzer et al.

(10) Patent No.: US 11,305,713 B2
(45) Date of Patent: Apr. 19, 2022

(54) VEHICLE SIDE UNDERRIDE GUARD

(71) Applicants: Stephen Allen Batzer, Fife Lake, MI (US); Patrick Keith Rogers, Fayetteville, AR (US)

(72) Inventors: Stephen Allen Batzer, Fife Lake, MI (US); Patrick Keith Rogers, Fayetteville, AR (US)

(*) Notice: Subject to any disclaimer, the term of this patent is extended or adjusted under 35 U.S.C. 154(b) by 0 days.

(21) Appl. No.: 17/010,742

(22) Filed: Sep. 2, 2020

(65) Prior Publication Data

US 2022/0063535 A1   Mar. 3, 2022

(51) Int. Cl.
*B60R 19/56*   (2006.01)
*B60R 19/42*   (2006.01)

(52) U.S. Cl.
CPC ............ *B60R 19/565* (2013.01); *B60R 19/42* (2013.01); *B60R 19/56* (2013.01)

(58) Field of Classification Search
CPC ........ B60R 19/56; B60R 19/565; B60R 19/42
USPC .................................................. 293/124, 128
See application file for complete search history.

(56) References Cited

U.S. PATENT DOCUMENTS 3,782,766 A * 1/1974 Teel ........................ B60R 19/02
                                                              293/117
4,105,237 A * 8/1978 Viall, Sr .................. B60R 19/56
                                                              180/275

2010/0264690 A1* 10/2010 Brown ................... B60R 19/565
                                                               296/180.4
2018/0118143 A1*  5/2018 Ponder .................. B60R 19/565
2018/0304941 A1* 10/2018 Ehrlich ................. B62D 35/001
2019/0077470 A1*  3/2019 Kunkel .................... B62D 21/20
2019/0184925 A1*  6/2019 Roush ................... B60R 19/565
2019/0256026 A1*  8/2019 Kunkel ................. B60R 19/565

FOREIGN PATENT DOCUMENTS

CA       2200784 A1 *  9/1998   .......... B60R 19/565
CN     209816734 U  * 12/2019   .............. E01F 15/06

* cited by examiner

*Primary Examiner* — Jason S Morrow (57) ABSTRACT

Side underride collision guards configured to be incorporated beneath the cargo containment structures of large powered or unpowered vehicles are described. These collision guards are designed to absorb the force and kinetic energy of a lateral impact from a striking vehicle in an efficient manner. The guards disclosed are suited for incorporation into those vehicles with an elevated side structure, regardless if those vehicles are equipped with or without a sliding rear axle or axles. The guards comprise at least one impact force resisting structure per vehicle side, typically wire rope, oriented axially and mounted at or near each outboard side of the vehicle. The wire rope is attached to a plurality of support members connecting the linear structures to supporting members of the vehicle. The supported linear guard interaction members diminish the impact hazard presented to other roadway users that comprises the lower axial edges of the vehicle, typically a cargo box container, which is geometrically mismatched to the impacting vehicle, typically a passenger vehicle, as the container box edges are elevated above the front and rear bumper height of the impacting vehicle.

4 Claims, 9 Drawing Sheets

Fig. 9

VEHICLE SIDE UNDERRIDE GUARD

BACKGROUND OF THE INVENTION

The principal hazard to occupants within passenger vehicles is that of collisions. Vehicle impacts result in secondary occupant to interior object impacts, and can also produce partial and complete occupant ejections and fuel fed fires. Modern passenger automobiles are designed to provide robust protection to occupants through the incorporation of various safety technologies such as safety belts, airbags, yielding interior surfaces, and door latching mechanisms which are resistant to inadvertent actuation. One durable challenge to automobile crashworthiness is geometric mismatch where the designed interaction structures (such as bumpers, side-impact bars within the doors, and the roof canopy) are bypassed. This undesirable event occurs most frequently between passenger vehicles and cargo delivery vehicles such as large box trucks and towed box trailers.

The frequently referenced engineering "Safety Hierarchy" [see, i.a., Morse and Batzer, 2009] indicates that the optimal solution addressing a hazard is simply designing the hazard out of existence. For example, constructing an overpass for rail traffic such that the locomotive and automotive travel pathways do not intersect, and thus the intersection hazard presented to both vehicle types is eliminated. With respect to vehicle-to-vehicle interactions on roadways, the overpass prevention solution is not practicable, and automobile collision opportunities are not expected to be eliminated in the foreseeable future. Further, the relatively elevated geometry of commercial cargo vehicles is also not expected to be eliminated in the near future as warehouse loading docks are also elevated and the cost of reconfiguring the national infrastructure for box trailers and box trucks would be prohibitive. Thus mechanical guarding, which is the next preferred solution from the Safety Hierarchy for those hazards which cannot be eliminated, is a viable solution to the geometric mismatch problem presented by passenger vehicles and commercial vehicles, both box trucks and box trailers.

BRIEF SUMMARY OF THE INVENTION

The present invention relates generally to commercial vehicles with unprotected elevated side structures which present a geometric mismatch to passenger vehicles on the public roadways. During passenger vehicle to commercial vehicle side impact, unprotected elevated structures pose an enhanced injury threat to passenger vehicle occupants. For example, large box trucks, which are self-propelled vehicles, typically have their cargo boxes elevated above that of the expected and intended passenger vehicle interaction surface which is the front bumper. Another application example is box semi-trailers, which are towed vehicles, that also typically present a side underride hazard to many passenger vehicles. The present invention addresses the hazard of side underride impacts by passenger vehicles by physically guarding the space beneath the elevated structure of the impacted commercial vehicle. The invention will slow, stop, or redirect the impacting vehicle with the intention of eliminating passenger compartment intrusion (PCI). The present invention disclosure may include one of the following technological elements, or a combination of the listed elements.

According to one embodiment of the invention, a wire rope underride guarding system is configured for a powered or unpowered large vehicle covering the majority or all of the heretofore unguarded, geometrically mismatched, lateral sides of the vehicle. The wire rope acts as the principle guard component which interacts with the impacting vehicle and resists the forces developed during the crash pulse. This embodiment uses guides which redirect the wire ropes disposed on either side of the vehicle around the axle, wheels and tires in order to attach the rearmost end of the wire rope directly or indirectly to the rear underride guard which is a pre-existing vehicle component. In some embodiments, a tensioning system is incorporated to accommodate axle fore-aft adjustment for those vehicles equipped with one or more sliding rear axles. In the preferred embodiment for an unpowered sliding axle vehicle, that is, a conventional commercial box trailer, the system routes the wire ropes or cables above the vehicle's outboard rear tires and wheels. By de-tensioning the wire rope while the vehicle is not in active service, the axle system can be adjusted to optimize its fore-aft axial position according to user preference. After axle position adjustment, the wire rope or cable is then re-tensioned and the vehicle may return to service and normal roadway travel.

According to one embodiment of the invention, a singular or plural wire ropes or cables are disposed on each side of the vehicle used as the primary engagement structure to redirect, slow, or stop an impacting vehicle. In this configuration, the wire rope side underride guarding system is equipped with one or more energy dissipating components attached in series with the wire rope in order to absorb kinetic energy. Thus, the wire rope and the accompanying mounting components primarily act as force absorbing structures while the in-line energy absorbing structures dissipate impacting vehicle collision energy by intentional plastic deformation.

According to one embodiment of the invention, a bracing system for the wire rope components of the side underride guard is configured such that the loaded wire rope(s) on the impacted side of the vehicle are supported by the initially non-loaded wire rope(s) on the opposite side of the vehicle. The bracing system is intended to ensure that a substantial vehicle impact load magnitude will be resisted by the entirety of the guarding system, rather than simply by the near side components. The lateral load transferal structures consist of pairs of vertical wire rope support posts disposed on opposites sides of the vehicle at the same axial position. Each vertical post holds and positions its attached wire rope or ropes principally vertically and laterally but may, in some configurations, allow for axial motion of the wire rope. Each pair of vertical wire rope supports are connected via a horizontal and principally linear member comprising a cross brace that is fastened in a manner that will cause intentional detachment from the cargo box floor transverse floor beam during a major side collision prior to destruction of the brace. In this embodiment, the wire rope supporting cross braces are only semi-permanently attached with fasteners which are designed to release the cross brace above the threshold of a minor collision (such as a sideswipe), but before the cross brace is sufficiently damaged such that the load is not being transferred to the initially unloaded side of the guarding system. According these embodiments of the invention, the novel side impact guards are configured to be installed as post-manufacture retrofits of vehicles which were either not originally equipped with a side impact guard or were equipped with an inadequate side impact guard.

In the preferred embodiment of the invention, the inventive side impact guards are configured to be installed onto a powered or unpowered vehicle with a fixed or sliding axle(s) during the primary assembly stage of vehicle manufacture and are integral components of the trailer design. For these embodiments, during normal cargo transportation usage the vehicle's cargo box floor is supported principally by normal transverse floor beams, but the cargo box floor is also supported in part by one or more special floor beams which are the top horizontal and linear component of the cross bracing system. These cross braces have an inherent crashworthiness function to distribute impact loading efficiently from the vertical support on the impacted side of the guarded vehicle to its companion vertical support on the opposite side of the vehicle.

In some embodiments of the invention, the side impact guards are configured to mount lateral wind skirts for the purpose of increased fuel efficiency of the vehicle to which the guards are mounted.

DETAILED DESCRIPTION OF THE INVENTION

The present invention is intended to address the geometric mismatch between large cargo-containing vehicles and other vehicles on the public roadways. The hazard represented by the space beneath the cargo compartment of box-trucks and box-trailers is both well known and largely unaddressed. As there is no domestic legal mandate to guard this space for the benefit of the occupants of passenger vehicles, it seems apparent that for cargo vehicle mismatch guarding to become more widespread, side underride guards will have to be effective, lightweight and economical. The present invention attempts to provide a methodology for efficiently guarding the entire space beneath the cargo containment structure in the vast majority of these powered and unpowered vehicles in a novel and comprehensive fashion. As the most typical mismatched vehicles for US roadways are box trailers (unpowered vehicles) with sliding dual rear axle assemblies; that vehicle type will be used consistently for the illustrative embodiment. However, the designs disclosed within this document identically pertain to box trucks (powered vehicles), and also to those vehicles with a fixed rear axle assembly.

Figure 1A:
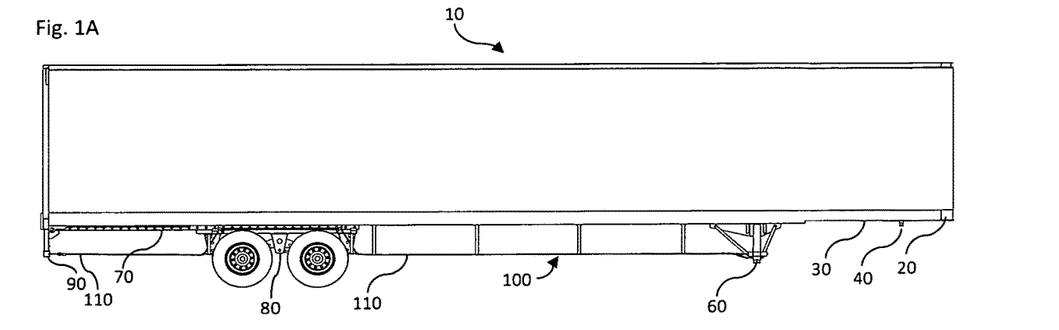
FIGS. 1A and 1B show profile schematic views of the inventive side underride guard system installed on an unpowered vehicle, the adjustable sliding axle assembly of which is shown in the forward-most position (1A) and also in the rear-most position (1B).
Figure 1B:
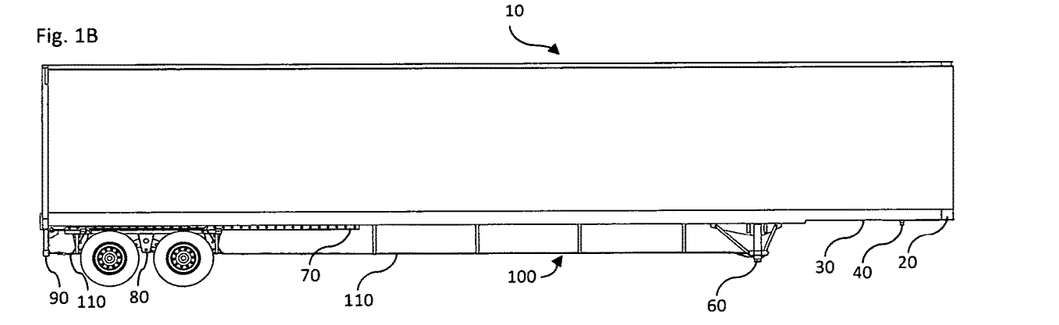

In FIG. 1A, a vehicle 10 is shown with a sliding rear dual axle assembly 80 adjusted to its forward-most position. The inventive side underride guard assembly 100 physically shields the space both in front of and behind the dual rear axle assembly. The same vehicle and guard elements are shown in FIG. 1B, but in this illustration, the sliding rear axle assembly is in a rearward position. The wire rope 110 which is the force absorbing component of the side underride guard is present on both lateral sides of the vehicle. Each wire rope extends continuously from the anchor point at the rear underride guard 90, an existing component of the trailer, to the landing leg 60 at the front of the vehicle. The guard described thus provides complete coverage, as the space forward of landing leg 60 is inherently guarded as this space accommodates the rear axle or axles of the prime mover which tows the vehicle.

Figure 2:
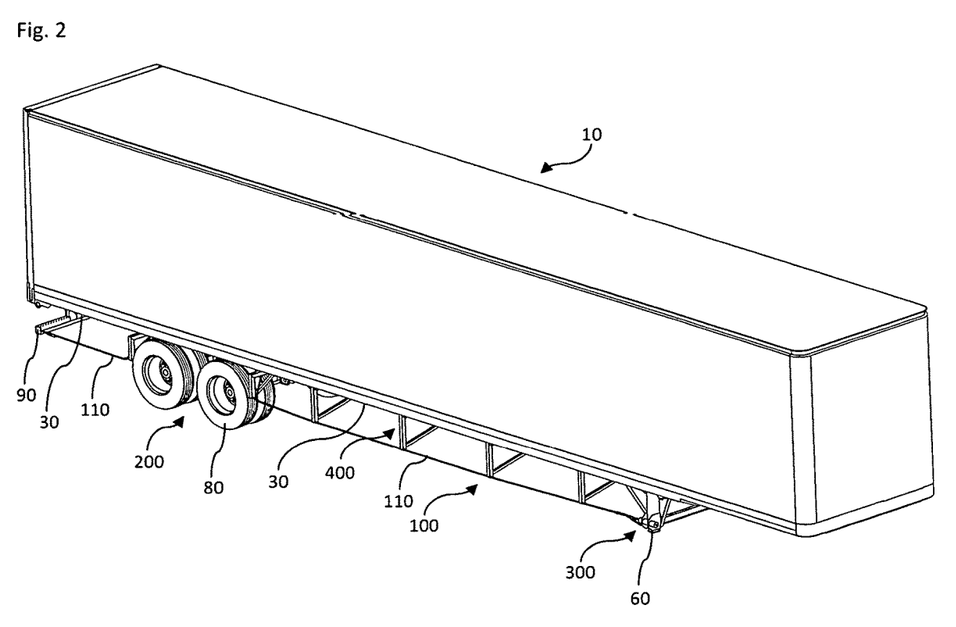
FIG. 2 shows an oblique schematic view of the inventive side underride guard system indicating the major component subassemblies.

As is shown in the oblique view of FIG. 2, a system of mechanical components guide the wire rope 110 non-linearly to accommodate the axially adjustable rear wheels and tires which are themselves subcomponents of the sliding rear axle assembly 80. In FIG. 2, the major system components are enumerated, and the aspects of these assemblies are described in more detail in successive figures and text. The inventive side underride guard 100 can be applied to vehicle 10 either as a post-assembly as an aftermarket retrofit or in the primary assembly stage. The guard provides impact protection for passenger vehicles such that a passenger vehicle laterally impact against vehicle 10 will produce initial contact into guard 100 rather than into cargo compartment lower edge 30. The side underride guard's wire rope 110 provides primary impact force resistance. The wire rope is connected at the aft end at an existing vehicle component, the rear underride guard 90. Wire rope 110 then proceeds forward, is redirected by wire rope guide 200 to accommodate the space taken by rear axle assembly 80 (which can be fixed or sliding), and then wire rope 100 terminates at another pre-existing component, the telescoping landing leg 60 in the illustrative embodiment. The wire ropes 110 can also terminate at the cab for a powered vehicle, or they can terminate at a purpose-designed bracket if the landing legs are not appropriate for some design-specific reason. When impacted, wire rope 110 has two associated assemblies which can prevent the impact force resisting structure from becoming overloaded and failing. The first is impact energy dissipator 300 located at the forward terminus of wire rope 110. This dissipator plastically deforms as a result of loading and both limits the loading magnitude applied to wire rope 110 and also converts a fraction of the kinetic energy of impact from the passenger vehicle into heat and the energy of deformation. The second component which supports the impacted wire rope 110 when the impact is located forward of the rear axles 80 of vehicle 10 is one or more cross brace 400 assemblies which transfer contact load from the impacted wire rope segment to the initially unloaded wire rope segment on the vehicle side opposite of the impact.

Figure 3A:
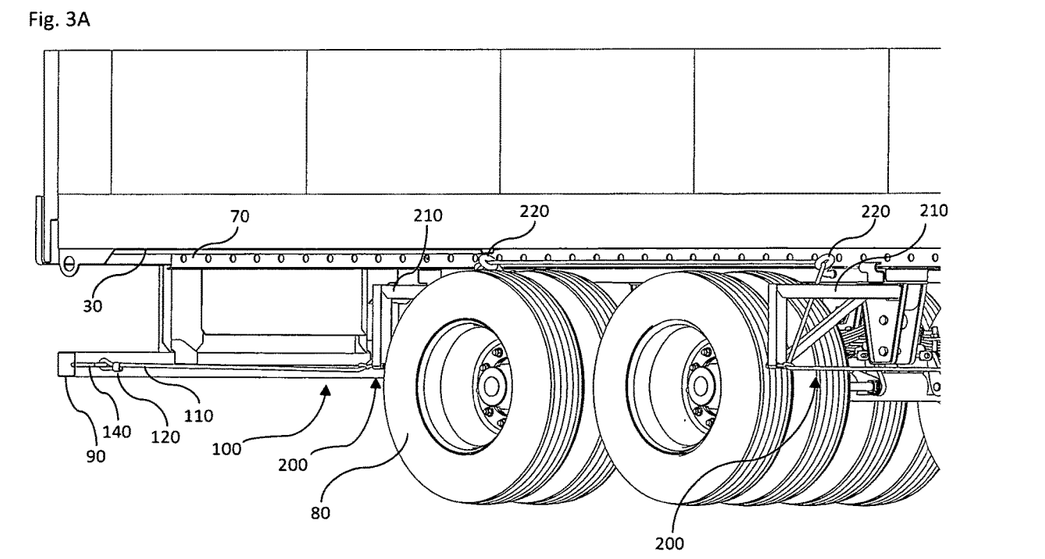
FIGS. 3A and 3B illustrates the aft portion of the inventive side underride guard system in oblique and overhead cross-sectional views to describe the method of wire rope routing that accommodates the sliding rear axle assembly of the illustrative unpowered vehicle.
Figure 3B:
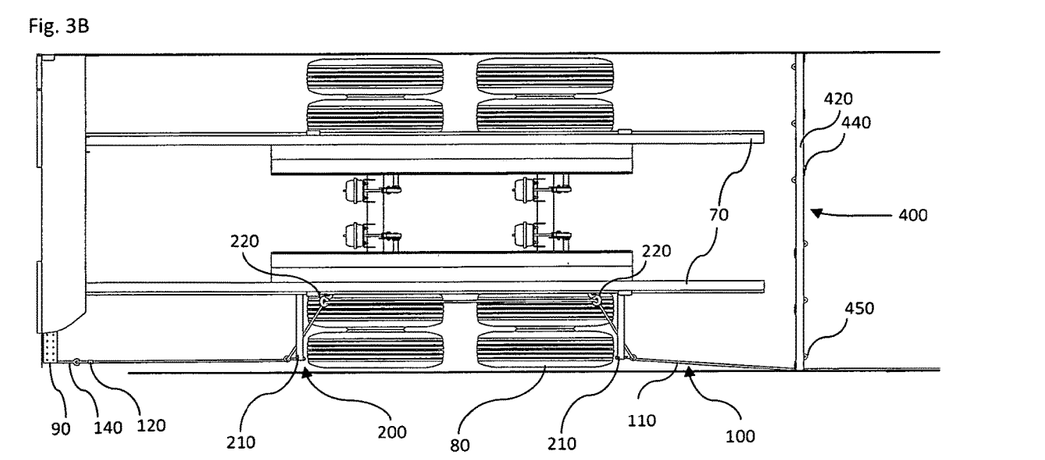
Figure 4:
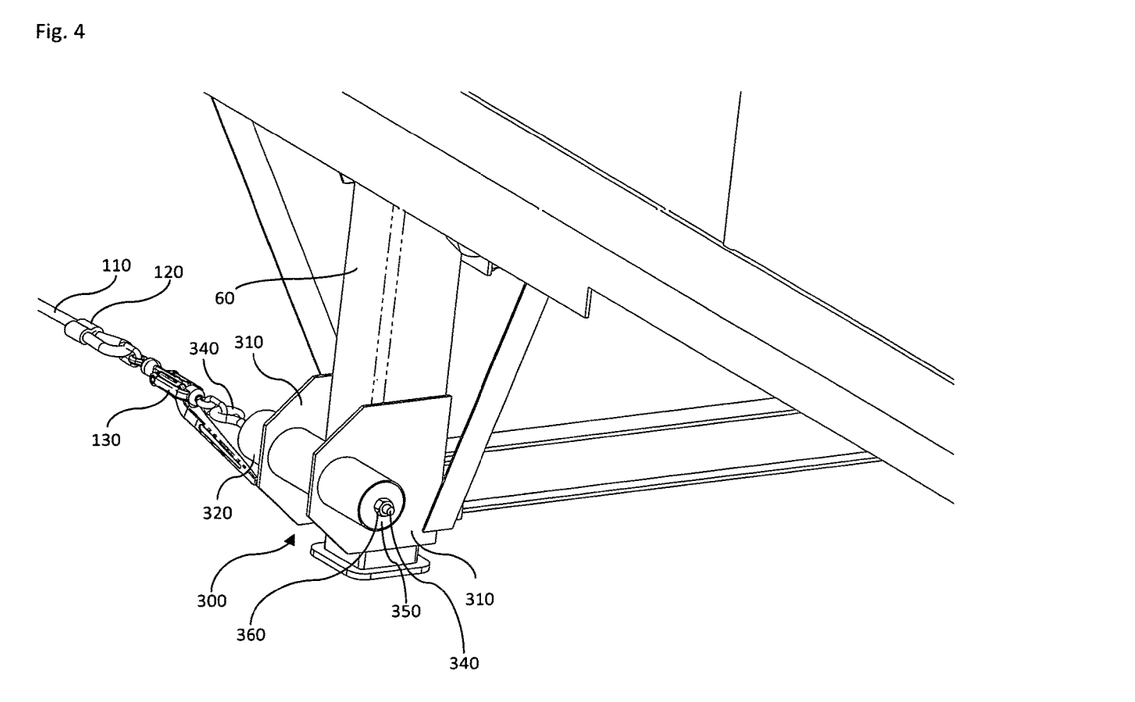
FIG. 4 illustrates the forward most portion of the side underride guard system including the tensioning system and the associated energy dissipating assembly mounted to the landing leg on the right side of the illustrative unpowered vehicle.

FIGS. 3A and 3B show views of the rear aspect of the side underride guard 100 in the illustrative embodiment. As is depicted, the load path of wire rope 110 begins at the aft end of the heretofore unguarded space, and provides continuous coverage as rear axle assembly 80 is adjusted for axial position. Rear mount 140 is the aft terminus of the side underride guard components and the mount is attached to rear underride guard 90. Rear mount 140 is depicted as a high strength eye bolt, but the mounting hardware for rear underride guard 90 can be a bracket or weld nut or any number of alternative anchoring devices. Wire rope 110 is looped through the eye of rear mount 140 and affixed to itself using one or more wire clamps 120. Wire rope 110 is directed using wire rope guide 200 which is itself mounted to the carriage of sliding axle 80. For each vehicle side, wire rope guide 200 uses two lower rope guides 210 and two upper rope guides 220. As the entirety of wire rope guide 200 is affixed to the sliding axle assembly 80, these components move in unison. FIG. 3B shows an overhead construction view of the rearward end of the vehicle, highlighting components of the right-side guard to give an explanatory spatial description of the path of wire rope 110 with respect to the wire rope guide 200. Note the sliding axle assembly 80 is in the approximate mid-position of its fore-aft travel in FIGS. 3A and 3B. Wire rope guides 200 are also relevant to fixed axle vehicles due to geometric considerations if a substantial space is present between the rearmost wheels and the rear underride guard, and/or if the rear guard is chosen as the wire rope aft position anchoring point. FIG. 4 shows the forward terminus of wire rope 110 which is in a loop configuration as it is secured back onto itself using loop clamp 120. Wire rope 110 is attached to tensioning device 130; this component introduces slack to wire rope 110 to permit axle assembly 80 adjustment. A commercial tensioner is illustrated which consists of a load bearing buckle, connectors, pivoting hinged linkages, and a lever for mechanical advantage. However, any number of tensioning devices are envisioned, such as threaded fasteners, sheaves which displace the wire rope off axis, powered actuators, etc. Tensioner 130, in this illustrative embodiment, attaches to impact energy dissipator 300. The design of the illustrative impact energy dissipator is such that bolt 340 will displace rearward when the tension in wire rope 110 reaches a level which is a substantial fraction, approximately 60% to 85%, of the force required to cause an undesirable number of the wire rope's filaments to fail and for the wire rope to lose coherent strength. Thus, impact energy dissipator 300 acts as a load limiting device by the stroke of bolt 340. The construction of impact energy dissipator 300 consists of cup 320 which surrounds a volume of crush material 330 which is not visible in FIG. 4, such as honeycomb aluminum, which deforms, heats, and dissipates energy upon compressive deformation. Bolt 340 goes through the center of cup 320 and crush material 330, through compression washer 350 and finally is secured by nut 360. Impact energy dissipator 300, in this embodiment, is a largely cylindrical device used on each side of vehicle 10 and is secured to telescoping landing leg 60 by two brackets 310. Other embodiments use any number of force generation and energy dissipation techniques, such as a damper which uses fluid-through-orifice, or cantilever bending of a ductile cable mount, or an oversized tool which swages an undersized deformable cylinder upon axial motion.

Figure 5:
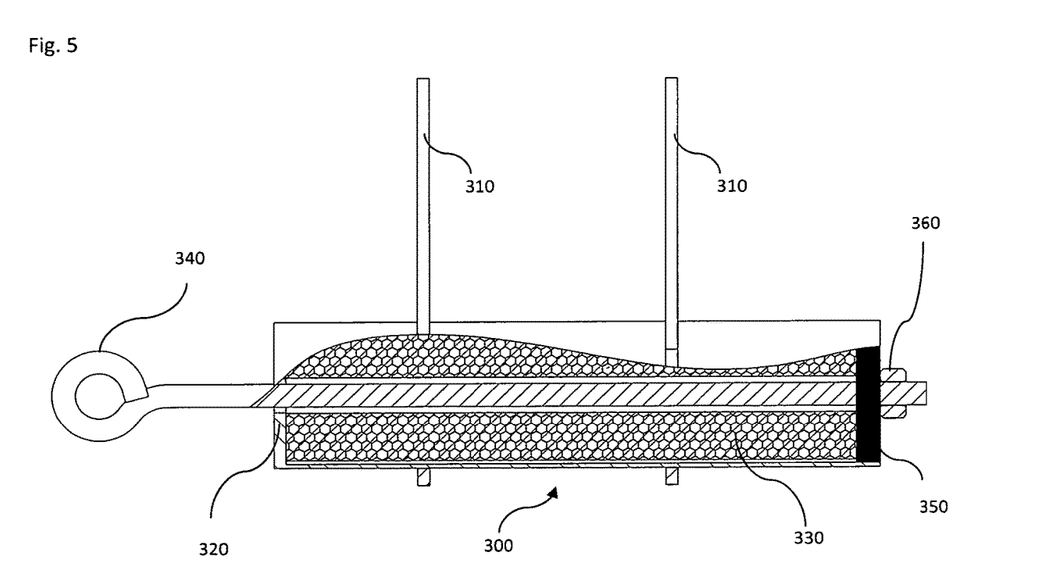
FIG. 5 shows a cross-section of the crush cylinder which is used as the principle energy absorbing sub-assembly for the illustrative embodiment of the inventive side underride guard.
Figure 6A:
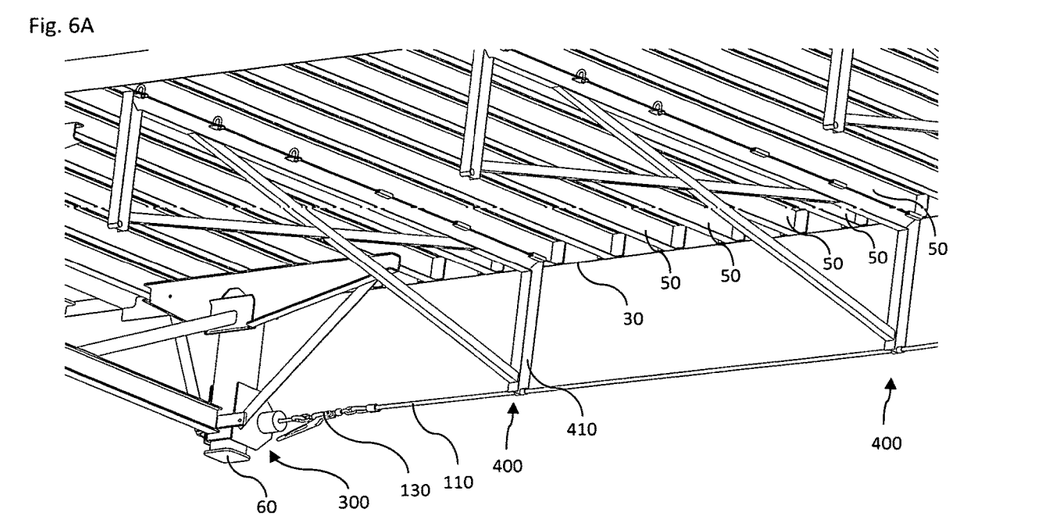
FIGS. 6A and 6B show retrofit single purpose cross braces mounted to existing cargo compartment floor beams.
Figure 6B:
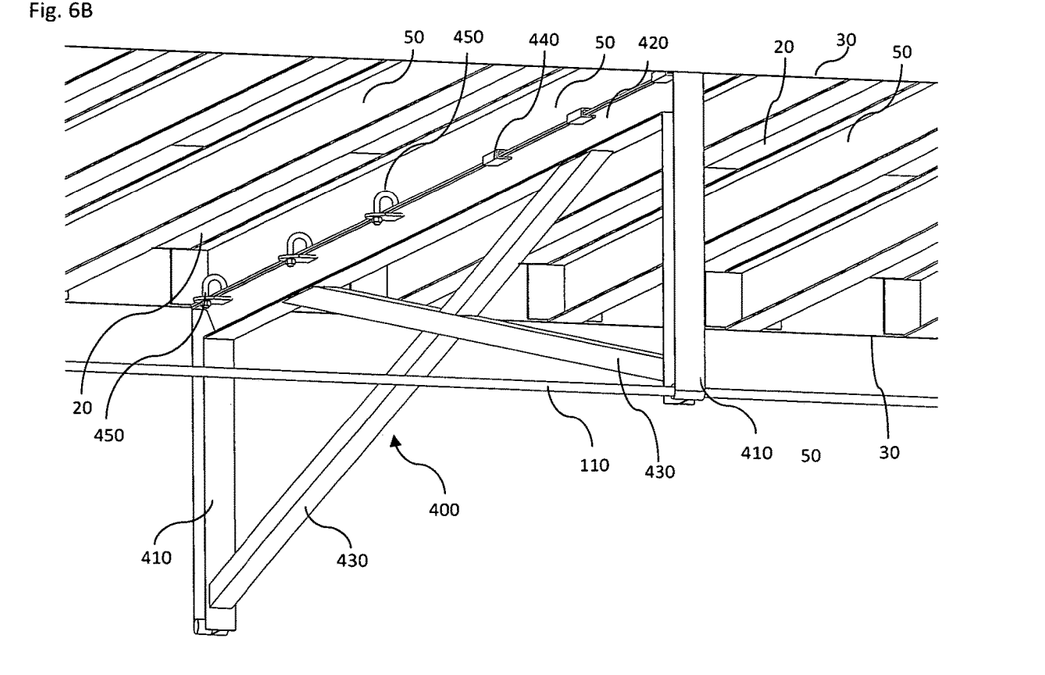

FIG. 5 provides a cross-sectional view of the illustrative impact energy dissipator embodiment. The mounting surface for the loop of wire rope 110 is bolt 340 which moves leftward as a result of substantial loading by wire rope 110 (not illustrated). The components as described previously are again detailed. Cylindrical cup 320 surrounds crush material 330 which is in a hollow cylindrical shape to permit the passage of bolt 340. The crush material 330 is squeezed between the closed end of cup 320 and compression washer 350 which is pushed by nut 360 that is affixed to the end of threaded bolt 340. Each assembly is mounted to telescopic landing leg 60 (not illustrated) using two brackets 310, said brackets typically being bolted or welded into place. FIGS. 6A and 6B illustrate cross brace assembly 400 in an installed position beneath the compartment floor 20 of vehicle 10. The first image shows two cross braces 400 from underneath the vehicle's cargo compartment from the left side of the vehicle. The second image shows a cross brace 400 from the vehicle's right side. For illustration, only one wire rope 110 is present in each image. In the illustrative embodiments of FIG. 6, none of the transverse floor beams 50 of vehicle 10 have been altered or removed to accommodate the inventive side underride guard. Thus, this embodiment shows a typical post-assembly retrofit of an unpowered vehicle. Cross brace 400 is generally in the shape of an inverted squared U with internal crossed linear load transferring members in the general form of an X. Each cross brace 400 has a transverse horizontal post 420 connected to two outboard vertical posts 410 which interface with the wire ropes 110. The horizontal post 420 and two vertical posts 410 are in turn reinforced with X-member 430. The cross brace 400 mounting strategy is to semi-permanently attach the flat top portion of horizontal post 420 to the bottom surface of transverse floor beam 50, which is typically the bottom flange of an I-beam. As illustrated in FIG. 6, the horizontal post 420 contains a plurality of clips (six shown in this embodiment) in the form of U-mounts 440 disposed on opposite outboard sides of the top of the horizontal post. Thus, upon installation, the top center point of cross brace 400 is placed beneath the bottom center point of transverse floor beam 50, but at a slight rotational angle, clockwise when viewed from above. Then cross brace 400 is then rotated, counter-clockwise in this illustrative embodiment, such that each of the six U-mounts 440 engages the bottom flange of the transverse floor beam 50. With cross brace 400 in place, six J-clamps 450, disposed three to one side and three on the opposite/far side, are then fastened into place to provide a friction lock between the interface of the cross brace 400 and transverse floor beam 50. When viewed from above, the illustrative cross brace 400 has its U-mounts 440 and J-clamps 450 in 180° rotational symmetry, see FIG. 3B. The use of U-mounts 440 and J-clamps 450 is merely an illustrative method of cross brace attachment to the bottom of the cargo compartment, as any number of methodologies of common mechanical attachment, such as welding, stand-alone clamps, rivets, etc., can be used in an equivalent attachment fashion.

In FIGS. 6A and 6B, each wire rope 110 is free to slide through a hollow cylindrical ferrule at the bottom of each vertical post 410. This movement permits slack introduced by tensioning device 130 to propagate along the side underride guard to where it is needed, that is, at the position of wire rope guide 200 where repositioning of wire ropes 110 during axle repositioning can cause significant friction and binding. However, in those system embodiments in which the tensioning device 130 is positioned to the aft end of the side underride guard 100 in the vicinity of the rear underride guard 90, and also in those system embodiments in which the tensioning device 130 is created as a component of wire rope guide 200, then it is not necessary to allow axial movement of wire rope 110 through vertical post 410. In those system embodiments, wire rope axial travel may be prevented to produce additional stiffness in the system. Wire rope 110 axial travel can be prevented, for example, by clamps in the fashion of loop clamp 120 disposed on one or both outboard positions of vertical post 410 or by incorporation of a deformable hollow cylindrical ferrule at the bottom of vertical post 410 which acts as an intrinsic wire rope clamp. The intention of cross braces 400 is to effectively double, at least approximately, the strength, stiffness and energy absorption of the near-side force absorbing linear member, wire rope 110, by ensuring that substantial transverse loading and deformation of the near side wire rope 110 will require nearly identical loading and deformation of the far side wire rope 110. It is an intention of the design that one or more cross braces 400 as illustrated in FIG. 6 will detach from the existing cargo compartment transverse floor beams 50 at a level of transverse vehicle impact force below that force level which will cause the near side vertical post 410 to collapse. Collapse is a condition in which increased deformation caused by wire rope 110 movement toward the impacted vehicle centerline will produce a diminishing resistance force magnitude of the vertical post 410. In other words, the design intent is that one or more cross braces 400 will detach from the vehicle 10 but remain attached to the side underride guard 100 before crash forces cause any near side vertical post 410 to become ineffective through damage induced by wire rope inboard displacement or by direct contact force by the impacting vehicle.

Figure 7A:
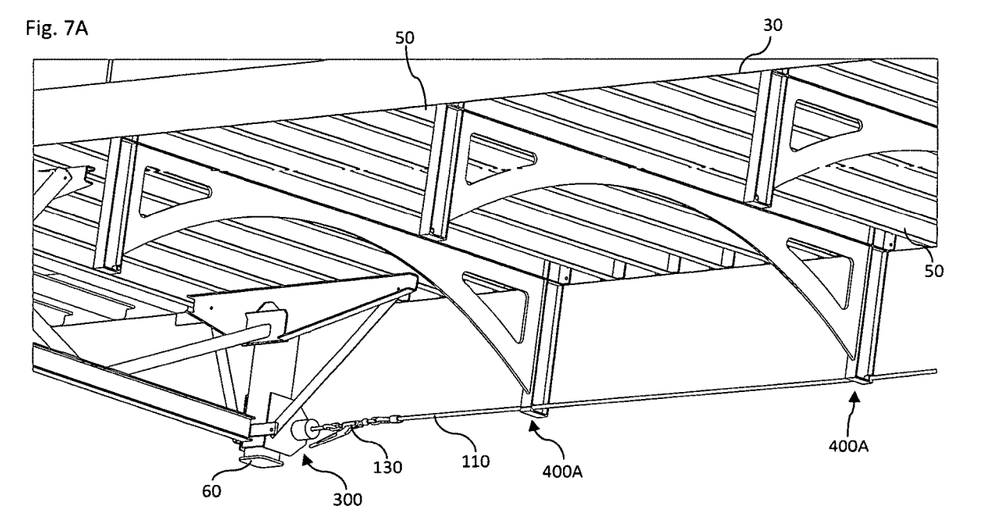
FIGS. 7A and 7B show original assembly dual purpose cross braces first as an unassembled component and then mounted directly to the cargo containment structure floor.
Figure 7B:
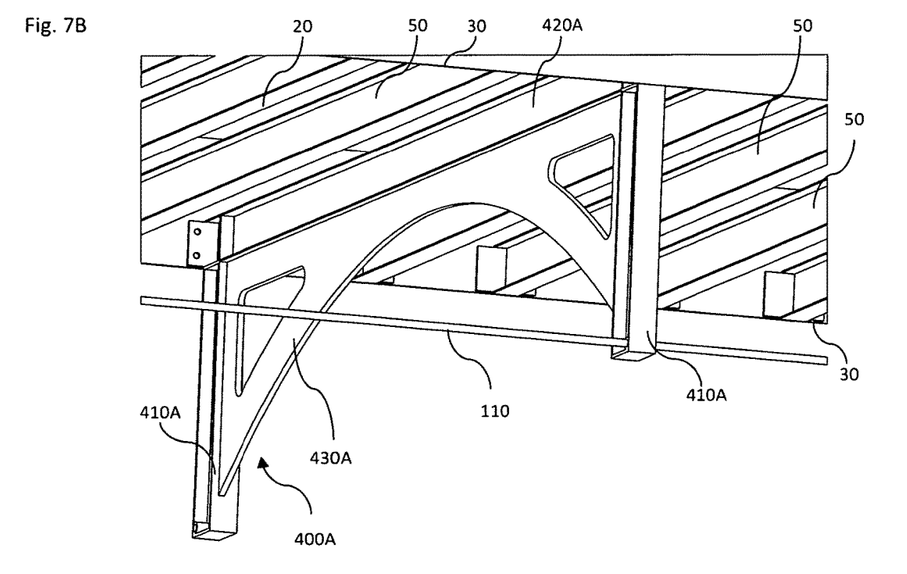

FIGS. 7A and 7B show a second illustrative embodiment of cross brace 400 as cross brace 400A. While the previous embodiments of FIG. 6 illustrated cross braces 400 as retrofit components, cross braces 400A shown in FIG. 7A replace one or more cargo compartment transverse cross braces 50. This cross brace 400A design serves a dual purpose; it provides vertical strength and stiffness to cargo compartment floor 20 during normal use of vehicle 10, and it also serves a crashworthiness function by providing transverse load sharing by the entirety of wire ropes 110 in the event of a transverse collision. This initial vehicle construction cross brace 400A is largely the same in construction as is that illustrated in FIG. 6, except that it bolts directly to the cargo compartment floor 20, and can also attach to the aluminum extrusion that typically defines the compartment lower edge 30 of the cargo compartment. As previously described, cross brace 400A is designed to detach more or less undamaged before the load sharing function is lost by vertical post 410A damage. That is, it is possible to attach horizontal post 420A firmly and permanently to compartment floor 20 such that the near side vertical post 410A and X-member 430A will collapse and stop supporting wire rope 110 on the near side of the transverse vehicle impact without any substantial loading of, and hence support by, the far side wire rope 110; this will occur if horizontal post 420A is fastened to its mounting surface so firmly that it will not detach via inboard directed loading of vertical post 410A at the point in which impact loading causes the vertical post 410A to hinge. Note that in normal use, there is no consequential transverse loading of a cargo compartment's transverse floor beams 50, and thus designing a fastener strategy which specifies, by design, the transverse load magnitude at which either transverse floor beam 50 or cross brace 400A will detach, typically by shearing of bolts shoulders or tensile failure of rivets, is straightforward.

Figure 8:
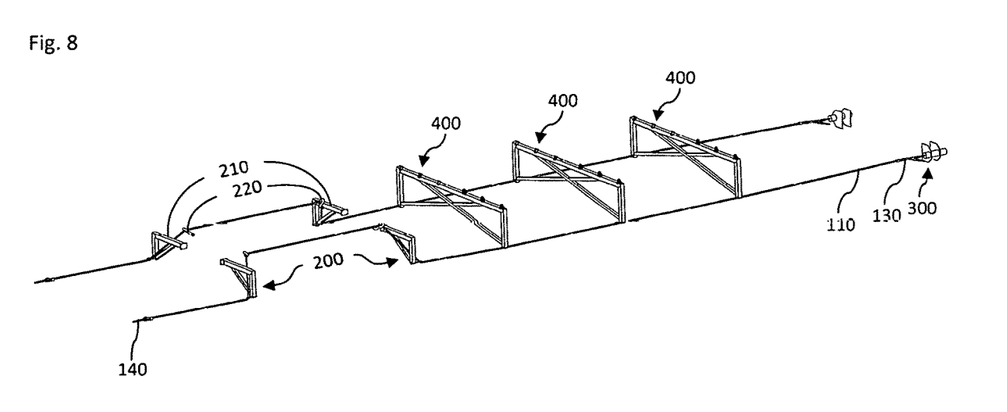
FIG. 8 shows one instantiation of the complete inventive side underride guard structure in an assembled configuration, separate from the vehicle.

FIG. 8 illustrates one illustrative invention side underride guard 100 embodiment designed for an unpowered vehicle with a sliding rear axle assembly in an assembled but otherwise "bare" state.

Figure 9:
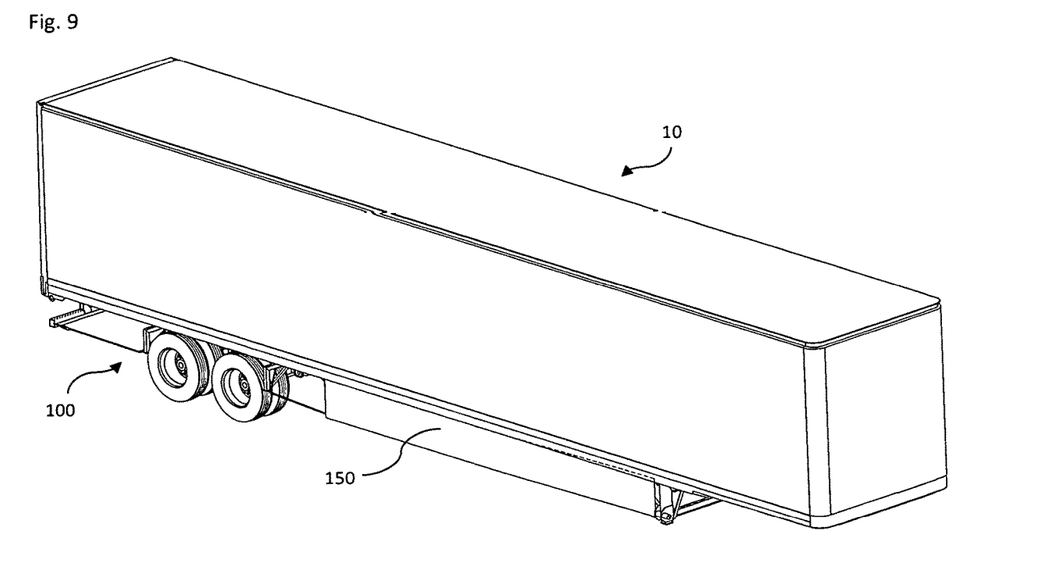
FIG. 9 shows an instantiation of the inventive side underride guard system in which an aerodynamic side fairing has been mounted.

FIG. 9 shows the illustrative invention embodiment 100 as it may be seen on the roadway with an aerodynamic skirt applied from the landing legs to the limit of travel of the sliding rear axles. This invention also envisions a hybrid arrangement of components such that a fixed side underride guard is emplaced somewhat forward of the limit of forward travel of the vehicle's rear axles and a wire rope force absorbing linear member 110 and system of wire rope guides 200 are used to guard the vehicle from the position of the fixed guard through to the rear underride guard.

We claim:

1. A side underride collision guard configured to be mounted onto a commercial cargo vehicle, comprising:
    at least one wire rope segment disposed upon each side of said vehicle which resists forces developed by an impacting vehicle, and
    in which said wire rope is provided vertical and lateral support by one or more cross braces oriented substantially perpendicular to the travel axis of said vehicle such that said wire rope is kinematically linked and provides mutual reinforcement during collision, said cross braces fastening to floor beams of said vehicle used to support the floor of said vehicle when loaded with cargo,
    said cross braces being semi-permanently attached to said floor beams such that said cross braces detach from said floor beams as a result of said vehicle colliding with an impacting passenger vehicle, and
    said cross braces further remaining substantially intact and maintaining crashworthiness at the time of detachment.

2. A side underride collision guard configured to be mounted onto a commercial cargo vehicle having a cargo box floor, comprising:
    at least one wire rope segment disposed upon each side of said vehicle which resists forces developed by an impacting vehicle,
    wherein said wire rope is supported by one or more cross braces oriented perpendicular to the axis of the vehicle such that said wire rope on each side of said vehicle is kinematically linked and provides mutual reinforcement during a collision, and
    said cross braces providing cargo box floor support in normal use and side underride guard support during vehicle impact,
    said cross braces being fastened semi-permanently to said cargo box floor such that said cross braces detach from said cargo box floor of said vehicle during vehicle impact, and
    said cross braces remaining substantially intact and maintaining crashworthiness at the time of detachment.

3. The side underride collision guard of claim 2, in which said guard further includes a wind fairing.

4. An over the road powered or unpowered vehicle having a rear axle or axles, outboard rear tires and wheels, and a side underride collision guard comprising:
    a cargo box container mounted above the rear axle or axles of said vehicle,
    at least one force resisting wire rope segment disposed below said cargo box container to resist forces developed during a lateral impact, and
    said force resisting wire ropes being configured nonlinearly for a portion of its length and routed above the outboard rear tires and wheels of said vehicle, and said force resisting wire rope further being disposed above, to the side, or a combination of directions to accommodate a local undercarriage geometry of said vehicle.

\* \* \* \* \*